United States Patent
Hasegawa et al.

(10) Patent No.: US 8,617,299 B2
(45) Date of Patent: Dec. 31, 2013

(54) FUEL VAPOR PROCESSING CANISTER

(75) Inventors: Masakazu Hasegawa, Miyoshi (JP); Masahiro Sugiura, Anjo (JP)

(73) Assignee: Aisan Kogyo Kabushiki Kaisha, Obu-Shi, Aichi-Ken (JP)

( * ) Notice: Subject to any disclaimer, the term of this patent is extended or adjusted under 35 U.S.C. 154(b) by 159 days.

(21) Appl. No.: 13/037,533

(22) Filed: Mar. 1, 2011

(65) Prior Publication Data
US 2011/0214572 A1    Sep. 8, 2011

(30) Foreign Application Priority Data

Mar. 2, 2010   (JP) ................................ 2010-045310
Jan. 21, 2011  (JP) ................................ 2011-010619

(51) Int. Cl.
*B01D 53/02*    (2006.01)

(52) U.S. Cl.
USPC .................. 96/121; 95/146; 96/139; 96/144; 96/152; 123/519

(58) Field of Classification Search
USPC .............................. 96/108–154; 123/434–593
See application file for complete search history.

(56) References Cited

U.S. PATENT DOCUMENTS

| | | | | |
|---|---|---|---|---|
| 4,673,420 A * | 6/1987 | Haker et al. | ..................... | 96/118 |
| 5,632,251 A * | 5/1997 | Ishikawa | ........................ | 123/519 |
| 6,230,693 B1 * | 5/2001 | Meiller et al. | ................. | 123/519 |
| 7,543,574 B2 * | 6/2009 | Yamazaki et al. | ............. | 123/519 |
| 2002/0124732 A1 * | 9/2002 | Hara et al. | ..................... | 96/131 |
| 2004/0050618 A1 * | 3/2004 | Marocco | ....................... | 181/248 |
| 2004/0055468 A1 * | 3/2004 | Makino et al. | .................. | 96/131 |

FOREIGN PATENT DOCUMENTS

JP    2002266709    9/2002

* cited by examiner

*Primary Examiner* — Duane Smith
*Assistant Examiner* — Joubert X Glover
(74) *Attorney, Agent, or Firm* — Ladas & Parry LLP

(57) ABSTRACT

A canister includes a first fuel vapor adsorption device and a second fuel vapor adsorption device. The second fuel vapor adsorption device can adsorb a part of fuel vapor that still remains in a gas after desorption by the first fuel vapor adsorption device. The second fuel vapor adsorption device includes a first passage containing a fuel vapor adsorption material and a second passage containing no fuel vapor adsorption material. The first passage and the second passage allow the gas to flow therethrough. A gas introduction device allows the fuel vapor to flow from the second passage into the first passage.

17 Claims, 10 Drawing Sheets

FUEL VAPOR PROCESSING CANISTER

This application claims priority to Japanese patent application serial numbers 2010-045310 and 2011-010619, the contents of which are incorporated herein by reference.

BACKGROUND OF THE INVENTION

1. Field of the Invention

The present invention relates to canisters that can be used in fuel vapor processing apparatus which process fuel vapor produced in internal combustion engines of automobiles.

2. Description of the Related Art

A known canister is disclosed, for example, in Japanese Laid-Open Patent Publication No. 2002-266709. Referring to FIG. 14, there is shown a canister 101 disclosed in this publication.

As shown in FIG. 14, the canister 101 includes a case 102, a main adsorption material 113 and an auxiliary adsorption material 114 disposed within the case 102. A main chamber (including a first chamber 121 and a second chamber 122) and an auxiliary chamber 123 communicating with the main chamber (i.e., the first chamber 121 and the second chamber 122) and also communicating with the atmosphere are defined within the case 102. The main adsorption material 113 is filled within the main chamber (i.e., the first chamber 121 and the second chamber 122) for adsorbing a fuel component contained in a mixture of air and vaporized fuel introduced into the main chamber from a fuel tank (not shown). A mixture of air and vaporized fuel (fuel vapor) will be hereinafter called a "fuel vapor containing gas." The auxiliary adsorption material 113 is filled within the auxiliary chamber 123 and can adsorb a part of the fuel component (fuel vapor) contained in the fuel vapor containing gas introduced from the main chamber (i.e., the first chamber 121 and the second chamber 122) before the part of the fuel component is discharged from the auxiliary chamber 123 to the atmosphere. The resistance against flow of the fuel vapor containing gas through the auxiliary chamber 123 filled with the auxiliary adsorption material 114 is set to be smaller than the resistance against flow of the gas through the main chamber (i.e., the first chamber 121 and the second chamber 122) filled with the main adsorption material 113.

With the known canister 101, the fuel vapor produced in the fuel tank is introduced into the main chamber (i.e., the first chamber 121 and the second chamber 122) and is thereafter introduced into the auxiliary chamber 123 before being discharged to the atmosphere. Therefore, the main adsorption material 113 and the auxiliary adsorption material 114 adsorb the fuel vapor (i.e., the fuel component) of the fuel vapor containing gas before the gas is discharged to the atmosphere. Because the resistance against flow of the fuel vapor containing gas through the auxiliary chamber 123 filled with the auxiliary adsorption material 114 is set to be smaller than the resistance against flow of the gas through the main chamber (i.e., the first chamber 121 and the second chamber 122) filled with the main adsorption material 113, it is possible to suppress increase of resistance against flow of the gas (i.e., the fuel vapor containing gas) through the main chamber (i.e., the first chamber 121 and the second chamber 122) and the auxiliary chamber 123 during filling of fuel into the fuel tank. Therefore, the fuel filling operation can be facilitated.

In the known canister 101, activated carbon is used as the main adsorption material 113 of the main chamber (i.e., the first chamber 121 and the second chamber 122). On the other hand, a ceramic adsorption material having a honeycomb or slit structure or an adsorption sheet including partition walls constituting a honeycomb structure or a slit structure is used as the auxiliary adsorption material 114. Here, each of the partition walls includes two gas permeable sheets and activated carbon that is held between the sheets so as to be integrated therewith. Alternatively, each of the partition walls includes a single gas permeable sheet and activate carbon adhered to opposite sides of the sheet.

In this way, a ceramic adsorption material having a honeycomb or slit structure or an adsorption sheet including partition walls that constitute a honeycomb or slit structure is used as the auxiliary adsorption material 114. Therefore, the construction of the canister 101 is complicated and increase of the manufacturing cost is inevitable.

Therefore, there is a need in the art for a canister that can facilitate the fuel filling operation without accompanying substantial increase of the manufacturing cost.

SUMMARY OF THE INVENTION

A canister includes a first fuel vapor adsorption device and a second fuel vapor adsorption device. The second fuel vapor adsorption device can adsorb a part of fuel vapor that still remains in a gas after desorption by the first fuel vapor adsorption device. The second fuel vapor adsorption device includes a first passage containing a fuel vapor adsorption material and a second passage containing no fuel vapor adsorption material. The first passage and the second passage allow the gas to flow therethrough. A gas introduction device allows the fuel vapor to flow from the second passage into the first passage.

DETAILED DESCRIPTION OF THE INVENTION

Figure 1:
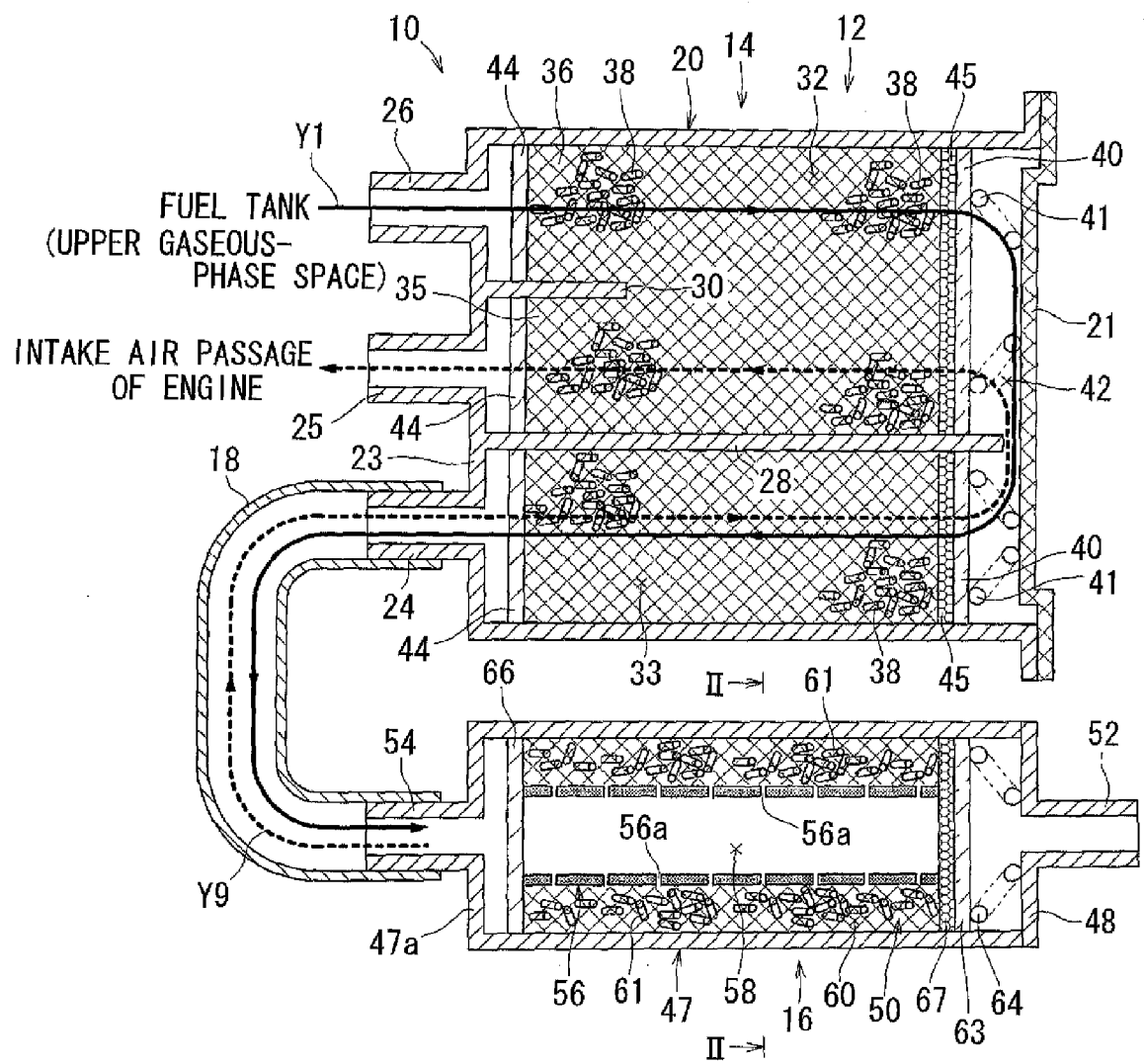
FIG. 1 is a horizontal sectional view of a canister according to a first example.

Each of the additional features and teachings disclosed above and below may be utilized separately or in conjunction with other features and teachings to provide improved canisters. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

In one example, a canister includes a case having a tank port communicating with an upper gaseous-phase space within a fuel tank, a purge port communicating with an intake air passage of an engine, and an atmospheric port communicating with an atmosphere. The case further includes an adsorption material chamber, an atmospheric communication chamber and a partitioning member. The adsorption material chamber communicates between the tank port and the purge port and stores a first adsorption material therein, which can adsorb fuel vapor and allow desorption of the fuel vapor. The atmospheric communication chamber communicates between the atmospheric port and the adsorption material chamber, so that air can flow through the atmospheric communication chamber in an air flowing direction. The partitioning member is disposed within the atmospheric communication chamber and extending along the air flowing direction, so that the atmospheric communication chamber is divided into an air flow passage and an adsorption material passage. The partitioning member allows passage of gas therethough in a direction intersecting with the air flowing direction. The air flow passage allows passage of air therethough. The adsorption material passage has a second adsorption material stored therein, which also can adsorb fuel vapor and allow desorption of the fuel vapor.

With this construction, when a large amount of gas (having a higher flow rate) flows from the adsorption material chamber toward the atmospheric port, e.g., during the filling operation of the fuel, almost of the gas flows through the air flow passage of the atmospheric communication chamber, so that the resistance against flow of the gas or loss of pressure of the gas is reduced. Therefore, the operation for filling the fuel can be facilitated. In addition, during the normal condition (such as a parking condition of the vehicle), a smaller amount of gas (i.e., air flowing at a lower flow rate) flows from the adsorption material chamber toward the atmospheric port, while the gas flows through the air flow passage of the atmospheric communication chamber. In this case, if the gas contains the fuel vapor, the flow rate of the gas (air) may be lowered and it takes a long time for the gas for flowing through the air flow passage, resulting in that the fuel vapor flows into the adsorption material passage via the partitioning member and is adsorbed by the second adsorption material. Therefore, it is possible to improve the ability of adsorbing the fuel vapor. Further, during the purging operation, a part of air introduced from the atmospheric port into the atmospheric communication chamber may flow into the adsorption material passage, so that the fuel vapor is purged from the second adsorption material of the adsorption material passage. In this example, in order to achieve these functions, it only requires a simple construction, in which the atmospheric communication chamber is divided into the air flow passage and the adsorption material passage by the partitioning member. Therefore, in comparison with the known canister as disclosed in Japanese Laid-Open. Patent Publication No. 2002-266709, it is possible to reduce the manufacturing cost. Thus, according to this example, it is possible to facilitate the fuel filling operation and to improve the ability of adsorbing the fuel vapor while reducing the manufacturing cost.

The partitioning member may include a plurality of partitioning members. Therefore, it is possible to provide a plurality of air flow passages and/or a plurality of adsorption material passages.

The case may include a first case body having the adsorption material chamber, a second case having the atmospheric communication chamber, and a communication member communicating between the adsorption material chamber and the atmospheric communication chamber. This arrangement allows the adsorption material chamber and the atmospheric communication chamber to be positioned remote from each other.

Alternatively, the case may be a single member having the adsorption material chamber and the atmospheric communication chamber formed therein. This may allow the canister to have a compact construction.

The second adsorption material contained in the adsorption material passage may be activated carbon having a high adsorption ability, so that it is possible to improve the adsorption ability of the canister. A desorption promoting device capable of promoting desorption of the fuel vapor from the activated carbon may be disposed within the adsorption material passage. Therefore, even though the second adsorption material has a relatively low ability in allowing desorption of the vapor due to its high adsorption ability, desorption can be efficiently performed. Hence, it is possible to minimize the residual fuel vapor while reducing the amount of the fuel vapor flowing out of the second adsorption material. The desorption promoting device may be a heat storage material and/or a heater, such as an electric heater.

Various examples will now be described with reference to the drawings.

First Example

Figure 2:
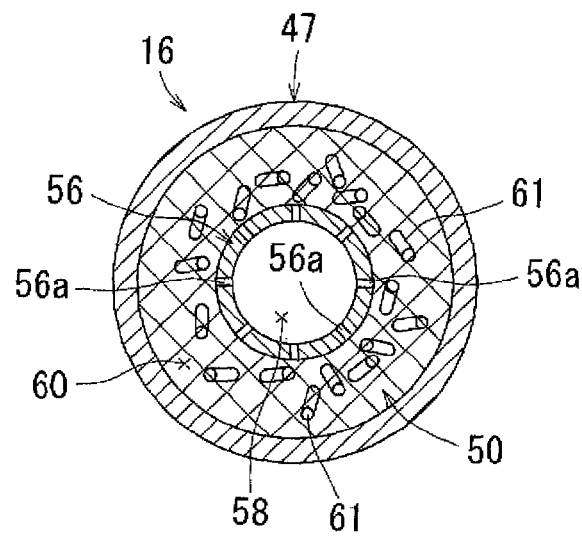
FIG. 2 is a sectional view taken along line II-II in FIG. 1.
Figure 3:
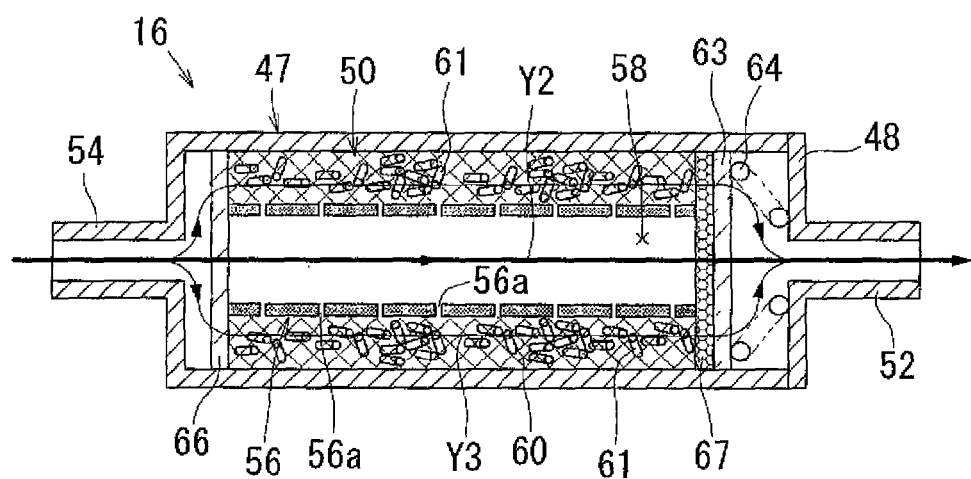
FIG. 3 is a view of a part of FIG. 1 showing flow of air within an atmospheric communication chamber during filling of fuel.
Figure 4:
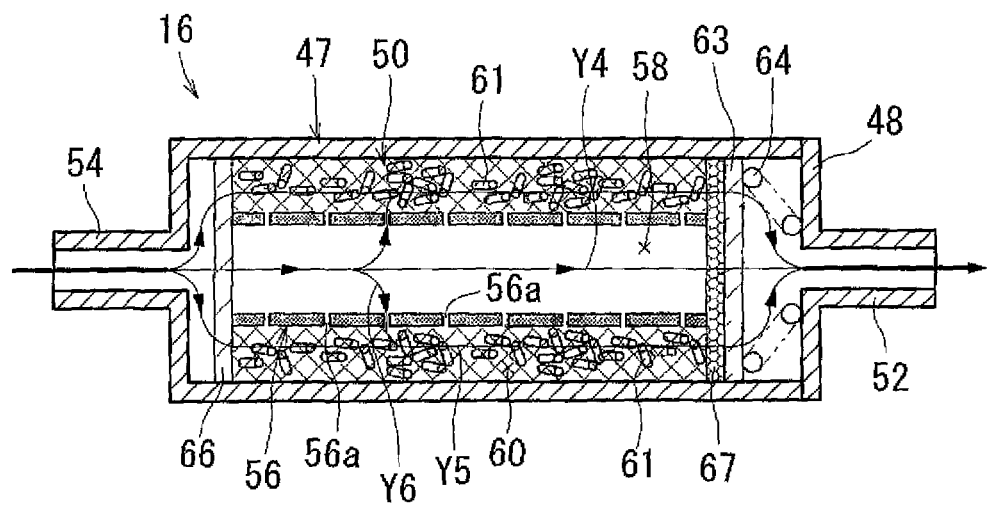
FIG. 4 is a view similar to FIG. 3 but showing flow of air within the atmospheric communication chamber during a normal condition.
Figure 5:
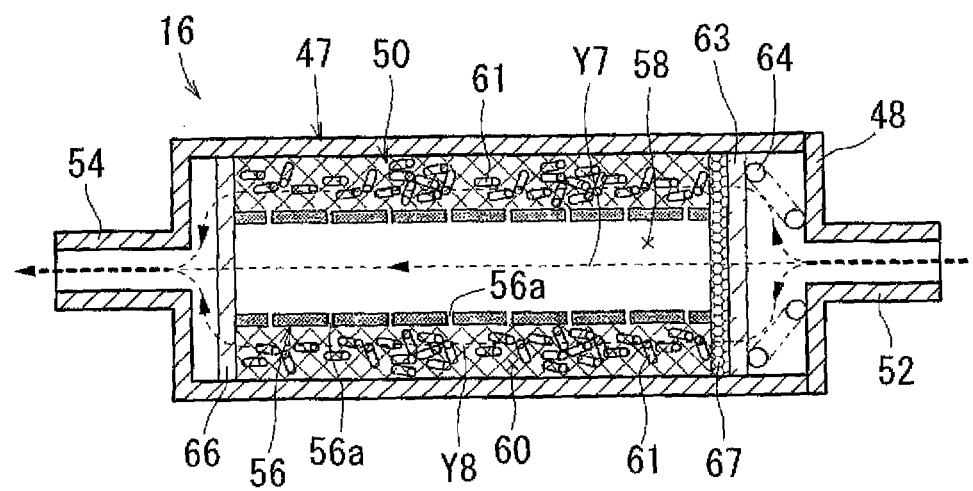
FIG. 5 is a view similar to FIG. 3 but showing flow of air within the atmospheric communication chamber during a purging operation.

A canister according to a first example will now be described with reference to FIGS. 1 to 5. Referring to FIGS. 1 to 2, there is shown a canister 10 in a horizontal sectional view and a sectional view taken along line II-II in FIG. 1, respectively. The canister 10 is designed for mounting to a vehicle, such as an automobile (not shown), and in this connection, the left side, the right side, the lower side and the upper side as viewed in FIG. 1 will be referred to as a front side, a rear side, a left side and a right side of the canister 10, respectively, for the purpose of explanation.

Referring to FIG. 1, the canister 10 has a case 12. The case 12 includes a first case 14, a second case 16 and a communication pipe 18. The second case 16 is a separate member from the first case 14. The communication pipe 18 communicates between a second adsorption chamber 33 defined in the first case 14 and an atmospheric communication chamber 50 defined in the second case 16. The first case 14 is made of resin and has a case body 20 and a lid plate 21. The case body 20 has a box-like shape and has a bottom. The lid plate 21, is mounted to the case body 20 for closing an open end of the case body 20 opposite to the bottom. In this example, the lid plate 21 is positioned on the rear side (right side as viewed in FIG. 1) of the case body 20, and the bottom of the case body 20 is positioned on the front side (left side as viewed in FIG. 1) of the case body 20.

The case body 20 has a front end plate 23 (disposed on the left side as viewed in FIG. 1), from which three ports 24, 25 and 26 extend forwardly in parallel to each other. The three ports 24, 25 and 26 are arranged in the right and left direction. The port 24 disposed on the left side (lower side as viewed in FIG. 1) serves as a connection port, to which one end of the communication pipe 18 is connected. The port 24 will be hereinafter also called a "connection port 24." The port 26 disposed on the right side (upper side as viewed in FIG. 1) serves as a tank port, which communicates with an upper space (gaseous-phase space) within a fuel tank via a fuel vapor passage (not shown), so that fuel vapor containing gas that contains fuel vapor produced within the fuel tank is introduced into the case body 20 via the port 26. The port 26 will be hereinafter also called a "tank port 26." The port 25 positioned on the central side serves as a purge port, which communicates with an intake air passage of an internal combustion engine via a purge passage (not shown). The port 25 will be hereinafter also called a "purge port 26." A purge control valve (not shown) is provided in the purge passage. The opening degree of the purge control valve is controlled by an electronic control unit ECU (not shown) during the operation of the engine, so that a purge control operation is performed.

A left partition wall 28 and a right partition wall 30 are formed integrally with a rear surface (inner surface) of the front end plate 23 of the case body 20. The left partition wall 28 extends to a position proximal to the lid plate 21 and divides the inner space of the case body 20 into a first adsorption material chamber 32 communicating with the purge port 25 and the tank port 26 and a second adsorption material chamber 33 communicating with the connection port 24. The extending length of the right partition wall 30 is set to be shorter than the extending length of the left partition wall 28. For example, the extending length of the right partition wall 30 may be about a quarter of the extending length of the left partition wall 28. The right partition wall 30 divides the front end portion of the first adsorption material chamber 32 into an outlet region 35 on the side of the purge port 25 and an inlet region 36 on the side of the tank port 26.

Adsorption materials 38 are filled within the first and second adsorption material chambers 32 and 33. The adsorption materials 38 can adsorb fuel vapor produced in the fuel tank and allow desorption of the absorbed fuel vapor as will be explained latter. In this example, activated carbon granules are used as the adsorption materials 38. Activated carbon is known to be a material capable absorbing a fuel component, such as butane, contained in the fuel vapor. Front and rear perforated plate members 40 each having a grid-like structure and allowing passage of gas are provided for holding the adsorption materials 38. The front and rear perforated plate members 40 are fitted into the rear end portions of the first and second adsorption material chambers 32 and 33, respectively, so as to be movable in the forward and rearward directions (left and right directions as viewed in FIG. 1). Springs 41 are interleaved between the perforated plate members 40 and the lid plate 21, so that the springs 41 resiliently press the perforated plate members 40 against the adsorption materials 38. A communication passage 42 is defined between the perforated plate members 40 and the lid plate 21 for communicating between the rear end portions of the adsorption material chambers 32 and 33.

Two first filters 44 and two second filters 45 are provided for retaining the adsorption materials 38. One of the first filters 44 is interleaved between the front end plate 23 of the case body 20 and the adsorption material 38 positioned within the outlet region 35 and the inlet region 36 of the first adsorption material chamber 42 opposed to the front end plate 23. The other of the first filters 44 is interleaved between the front end plate 23 and the adsorption material 38 positioned within the second adsorption material chamber 33. For example, the first filters 44 may be made of non-woven fabric. The second filters 45 are interleaved between the perforated plate members 40 and the adsorption material 38 positioned within the adsorption material chambers 32 and 33. For example, the second filters 45 may be made of polyurethane foam.

The second case 16 is made of resin and includes a bottomed cylindrical tubular case part 47 and a lid part 48 mounted to the case part 47 for closing the open end of the case part 47. In this example, the lid part 48 is positioned on the rear side (right side as viewed in FIG. 1) and the bottom of the case part 47 is positioned on the front side (left side as viewed in FIG. 1). The second case 16 is arranged in juxtaposed relationship with the first case 14 and positioned on the left side (lower side as viewed in FIG. 1) thereof.

The space within the second case 16 serves as the atmospheric communication chamber 50. An atmospheric port 52 extends from the rear surface (external surface) of the lid part 48 so as to be coaxial with the lid part 48. The atmospheric port 52 communicates with the atmospheric communication chamber 50 and is opened into the atmosphere. A connection port 54 extends from the front surface (external surface) of a front end plate 47a of the case part 47 so as to be coaxial with the front end plate 47a. The other end of the communication pipe 18 is connected to the connection port 54. Therefore, the atmospheric communication chamber 50 communicates with the second adsorption material chamber 33 of the first case body 14 via the communication pipe 18. The atmospheric communication chamber 50 has an axis that extends parallel to the direction of flow of gas through the atmospheric communication chamber 50. In this example, the axis of the atmospheric communication chamber 50 extends in the right and left direction as viewed in FIG. 1. The communication pipe 18 may be replaced with any other member as long as it serves as a communication member.

A cylindrical tubular partitioning member 56 is coaxially disposed within the atmospheric communication chamber 50 and divides the space of the atmospheric communication chamber 50 into a radially inner passage 58 and a radially outer passage 60 (see FIG. 2) each extending in an axial direction of the second case member 15 (the right and left direction as viewed in FIG. 1). The radially inner passage 58 serves as an air flow passage and will be also called an "air flow passage 58." The radially outer passage 60 serves to receive an adsorption material 61 that can adsorb the fuel vapor. Therefore, the radially outer passage 60 will be also called an "adsorption material passage 60." Similar to the adsorption materials 38, activated carbon granules can be used as the adsorption material 61 and can adsorb a fuel component, such as butane, contained in the fuel vapor. In particular, in this example, activated carbon having an adsorption ability of 8-12 g/dL in a butane working capacity measured according to ASTM D5228 standard test method is used for each of the adsorption materials 38 and 61.

A number of gas passage holes 56a are dispersively formed in the partitioning member 56 to extend therethrough in the diametrical direction. The gas passage holes 56a communicate between the air flow passage 58 and the adsorption material passage 60. Therefore, the partitioning member 56 allows a gas to pass therethrough in a direction perpendicular to or intersecting with the direction of flow of air within the air flow passage 58. In this example, the partitioning member 56 allows a gas to pass therethrough in a diametrical direction of the partitioning member 56, and air flows in an axial direction of the air flow passage 58 or the partitioning member 56, which is perpendicular to the diametrical direction. The partitioning member 56 may preferably be positioned at an upper region or at an upper most position within the atmospheric communication chamber 50 when the canister 10 is mounted to the vehicle.

As shown in FIG. 1, a perforated plate member 63 having a grid-like structure for allowing passage of gas is provided for holding the partitioning member 56 and the adsorption material 61. The perforated plate member 63 is fitted into the rear end portion of the atmospheric communication chamber 50 so as to be movable in the forward and rearward directions (left and right directions as viewed in FIG. 1). A spring 64 is interleaved between the perforated plate member 63 and the lid part 48, so that the spring 64 resiliently presses the perforated plate member 63 against the partitioning member 56 and the adsorption material 61.

A first filter 66 and a second filter 67 are provided for holding the adsorption material 61. The first filter 66 is interleaved between the front end plate 47a of the case body 47 and the partitioning member 56 opposed to the front end plate 47a. For example, the first filter 66 may be made of non-woven fabric. The second filter 67 is interleaved between the perforated plate member 63 and the partitioning member 56 and between the perforated plate member 63 and the adsorption material 61 opposed to the perforated plate member 63. For example, the second filter 67 may be made of polyurethane foam.

The operation of the canister 10 of the first example will now be described. During filling of fuel into the fuel tank of the vehicle or during a normal condition (such as a parking condition of the vehicle), a fuel vapor containing gas containing air and vaporized fuel produced within the fuel tank may be introduced from the fuel tank into the first adsorption material chamber 32 of the first case body 14 via the tank port 26 as indicated by a thick arrow Y1 in FIG. 1. The fuel vapor containing gas introduced into the first adsorption material chamber 32 then flows through the first adsorption material chamber 32, the communication passage 42 and the second adsorption material chamber 33. During this process, the adsorption materials 38 of the first and second adsorption material, chambers 32 and 33 adsorb the fuel vapor contained in the fuel vapor containing gas. The gas containing almost only air as a result of adsorption of the fuel vapor in the second adsorption material, chambers 32 and 33 then flows into the communication pipe 18 and further into the second case body 16 via the connection port 54. Thereafter, the gas flows into the atmospheric communication chamber 50 and is eventually discharged to the atmosphere from the atmospheric port 52.

During filling of fuel into the fuel tank or any other possible occasions, a large amount of a fuel vapor containing gas may be introduced from the tank port 26 into the adsorption material chambers 32 and 33, and therefore, a large amount of a gas (having a higher flow rate), i.e. a gas remaining after adsorption of fuel vapor from the fuel vapor containing gas) may flow from the second adsorption material chamber 33 to the atmospheric port 52. In this case, most of the gas flows through the air flow passage 58 of the atmospheric communication chamber 50 as indicated by a thick arrow Y2 in FIG. 3. The rest of the gas flows through the adsorption material passage 60 of the atmospheric communication chamber 50 (see thin arrows Y3 in FIG. 3). If the fuel vapor is still contained in the rest of the gas, it may be adsorbed by the adsorption material 61. In this way, the first case body 14 having the first and second adsorption material chambers 32 and 33 containing the adsorption materials 38 serves as a first fuel vapor adsorption device, and the second case body 16 having the adsorption material passage 60 containing the adsorption material 61 serves as a second fuel vapor adsorption device for adsorbing the fuel vapor that cannot be adsorbed by the first fuel vapor adsorption device.

During the normal condition (such as a parking condition of the vehicle), a smaller amount of the fuel vapor containing gas than that during filling of the fuel may be introduced from the fuel tank into the adsorption chambers 32 and 33 via the tank port 26, and therefore, a smaller amount of gas (having a lower flow rate) flows toward the atmospheric port 52 from the second adsorption material chamber 33. In this case, the gas flows through both of the air flow passage 58 and the adsorption material passage 60 of the atmospheric communication chamber 50 (see thin arrows Y4 and Y5 in FIG. 4). If the fuel vapor is still contained in the gas passing through the adsorption material chamber passage 60, it can be adsorbed by the adsorption material 61. Further, if the fuel vapor is still contained in the gas passing through the air flow passage 58, the flow rate of the gas may be lowered and the time required for the gas for flowing though the air flow passage 58 becomes long. Therefore, the fuel vapor may flow into the adsorption material passage 60 through the gas passage holes 56a of the partition member 56 (see thin arrow Y6 in FIG. 4). Then, the fuel vapor can be adsorbed by the adsorption material 61. In this case, because many of the fuel vapor is heavier than air, the fuel vapor can flow from the air flow passage 58 into the adsorption material passage 60 via the gas passage holes 56a. Therefore, the fuel vapor adsorbing ability of the canister 10 can be improved. As a result, almost only air is discharged into the atmosphere via the atmospheric port 52.

During the purging operation (i.e., the purge control operation during driving of the engine), the electronic control unit (ECU) may control the purge control valve to be opened, so that the negative pressure of the intake air is introduced into the first adsorption material chamber 32 via the purge port 25. Therefore, the atmospheric air is introduced into the atmospheric communication chamber 50 from the atmospheric port 52 of the second case body 16. Hence, the air drawn into the atmospheric communication chamber 50 flows through the air flow passage 58 and the adsorption material passage 60 of the atmospheric communication chamber 50 (see dotted arrows Y7 and Y8 in FIG. 5) in a direction opposite to the direction of flow of the fuel vapor containing gas. As the air flows in this way, the fuel vapor is desorbed or purged from the adsorption material 61 of the adsorption material passage 60, so that the desorbed fuel vapor flows together with the air from the connection port 54 to the second adsorption material chamber 33, the communication passage 42 and the first adsorption material chamber 32 via the communication pipe 18 (see dotted arrow Y9 in FIG. 1). At the same time, the fuel vapor is also desorbed (purged) from the adsorption materials 38 of the adsorption material chambers 32 and 33, discharged from the purge port 25 together with the air, and supplied into the intake air passage of the engine.

According to the canister 20 of this example, when a large amount of gas (having a higher flow rate) flows from the second adsorption material chamber 33 toward the atmospheric port 52, e.g., during the filling operation of the fuel, almost of the gas flows through the air flow passage 58 of the atmospheric communication chamber 50, so that the resistance against flow of the gas or loss of pressure of the gas is reduced. Therefore, the operation for filling the fuel can be facilitated. In addition, during the normal condition (such as a parking condition of the vehicle), a smaller amount of gas (i.e., air flowing at a lower flow rate) flows from the adsorption material chamber 33 toward the atmospheric port 52, while the gas flows through the air flow passage 58 of the atmospheric communication chamber 50. In this case, if the gas contains the fuel vapor, the flow rate of the gas (air) may be lowered and it takes a long time for the gas for flowing through the air flow passage 58, resulting in that the fuel vapor flows into the adsorption material passage 60 via the gas passage holes 56a of the partitioning member 56 and is adsorbed by the adsorption material 61. Therefore, it is possible to improve the ability of adsorbing the fuel vapor. Further, during the purging operation, a part of air introduced from the atmospheric port 52 into the atmospheric communication chamber 50 may flow into the adsorption material passage 60, so that the fuel vapor is purged from the adsorption material 61 of the adsorption material passage 60. In this example, in order to achieve these functions, it only requires a simple construction, in which the atmospheric communication chamber 50 of the second case body 16 is divided into the air flow passage 58 and the adsorption material passage 60 by the partitioning member 56. Therefore, in comparison with the known canister as disclosed in Japanese Laid-Open Patent Publication No. 2002-266709, it is possible to reduce the manufacturing cost. Thus, according to this example, it is possible to facilitate the fuel filling operation and to improve the ability of adsorbing the fuel vapor while reducing the manufacturing cost.

Further, the case 12 is constituted by the firs case body 14 having the first and second adsorption material chambers 32 and 33, the second case body 16 having the atmospheric communication chamber 50, and the communication pipe 18 communicating between the second adsorption material chamber 33 and the atmospheric communication chamber 50. Therefore, it is possible to arrange the second adsorption material chamber 33 and the atmospheric communication chamber 50 at positions remote from each other.

Various examples that are modifications of the first example will now be described with referenced to FIGS. 6 to 13. In FIGS. 6 to 13, like members are give the same reference numeral as the first example, and the description of these members will not be repeated.

Second Example

Figure 6:
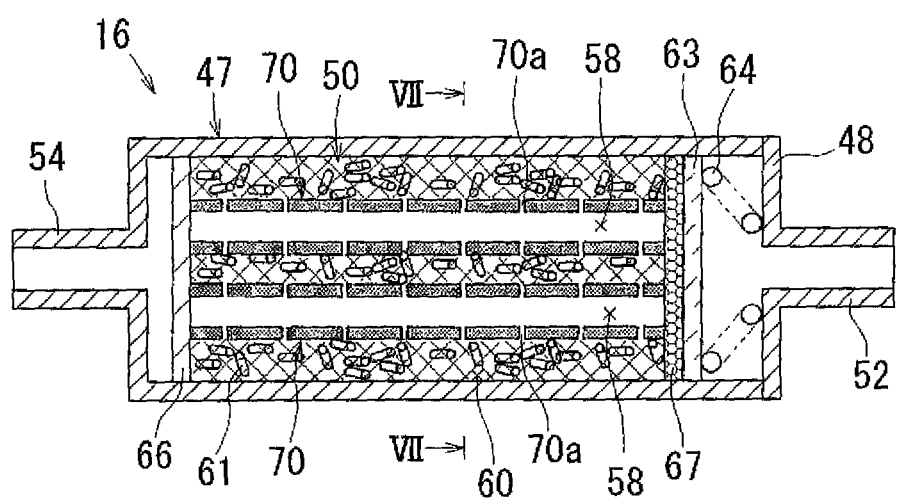
FIG. 6 is a horizontal sectional view of a second case body of a canister according to a second example.
Figure 7:
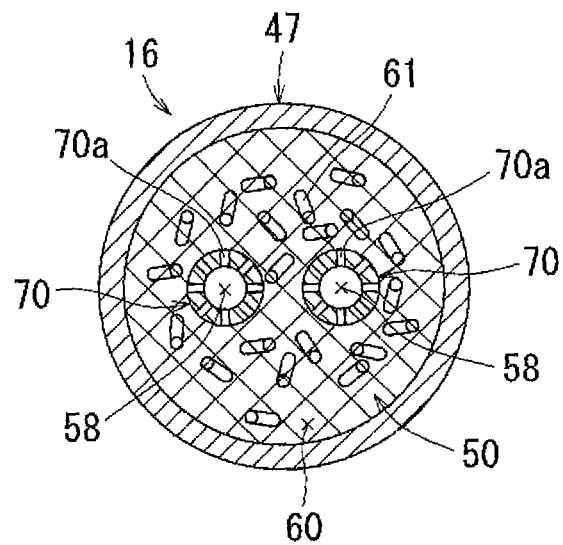
FIG. 7 is a sectional view taken along line VII-VII in FIG. 6.

A second example will now be described with referenced to FIGS. 6 and 7. Referring to FIGS. 6 and 7, according to this example, two left and right cylindrical tubular partitioning members 70 are disposed within the atmospheric communication chamber 50 of the second case body 16 in parallel relationship with each other. In this example, the air flow passage 58 is defined within each of the partitioning members 70. The space within the atmospheric communication chamber 50 on the outer side of the partitioning members 70 serves as the adsorption material passage 60. In addition, a plurality of gas passage holes 70a are dispersively formed in each of the portioning members 70 to extend therethrough in the diametrical direction. According to this example, because two parallel partitioning members 70 are provided within the atmospheric communication chamber 50 of the second case body 16, it is possible to provide a plurality of the air flow passages 58.

Alternative Examples of Second Example

As an alternative example of the second example, it may be configured such that the space on the outer side of the partitioning members 70 serves as the air flow passage 58, while the space within each of the partitioning members 70 serves as the adsorption material passage 60. According to this arrangement, it is possible to provide a plurality of the adsorption material passages 60. In another alternative example, three or more parallel partitioning members 70 may be provided for defining therein the air flow passages 58 or the adsorption material passages 60.

Third Example

Figure 8:
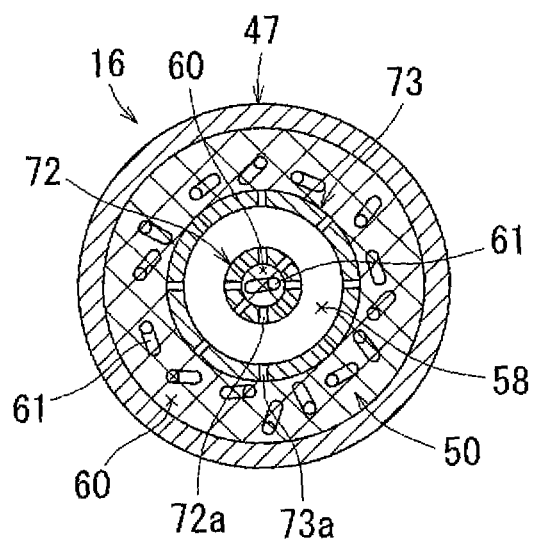
FIG. 8 is a horizontal sectional view of a second case body of a canister according to a third example.

A third example will now be described with reference to FIG. 8. Referring to FIG. 8, two inner and outer cylindrical tubular partitioning members 72 and 73 are disposed coaxially within the atmospheric communication chamber 50. In this example, the space between the partitioning members 72 and 73 serves as the air flow passage 58, while the space within the inner partitioning member 72 and the space on the outer side of the partitioning member 73 serves as the adsorption material chambers 60. A plurality of gas passage holes 72a and 73a are dispersively formed in the portioning members 72 and 73 to extend therethrough in the diametrical direction, respectively. The gas passage holes 72a communicate between the air flow passage 58 defined on the outer side of the inner partitioning member 72 and the air flow passage 60 defined within the inner partitioning member 72. The gas passage holes 73a communicate between the air flow passage 58 defined within the outer partitioning member 73 and the air flow passage 60 defined on the outer side of the outer partitioning member 73.

According to this example, two partitioning members 72 and 73 are provided within the atmospheric communication chamber 50. Therefore, it is possible to provide two adsorption material passages 60. As an alternative example of the third example, it may be configured such that the space between the inner and outer partitioning members 72 and 73 serves as the adsorption material chamber 60, while the space within the inner partitioning member 72 and the space on the outer side of the outer partitioning member 73 serve as the air flow passages 58. In this case, it is possible to provide a plurality of the air flow passages 58. Further, it is also possible to provide three or more coaxial partitioning members 70.

Fourth Example

Figure 9:
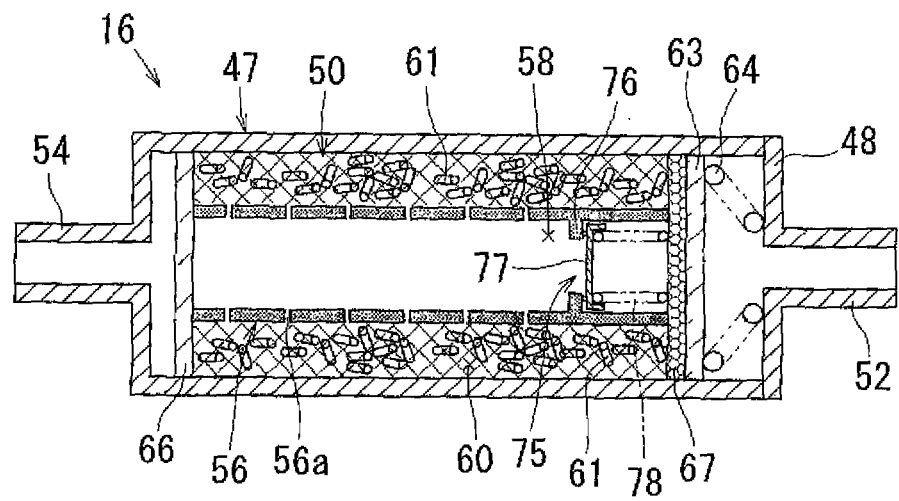
FIG. 9 is a horizontal sectional view of a second case body of a canister according to a fourth example.

A fourth example will now be described with reference to FIGS. 9 and 10. Referring to FIG. 9, according to this example, a relief valve 75 is provided within the rear end portion of the partitioning member 56. The relief valve 75 opens when a pressure of gas (air) flowing through the air flow passage 58 becomes equal to or more than a predetermined value. The relief valve 75 includes an annular valve seat 76, a valve plate 77 and a spring 78. The valve seat 76 is formed on the inner circumferential surface of the rear end portion of the partitioning member 56. The valve plate 77 is disposed within the rear end portion of the partitioning member 56 so as to be movable therein in forward and rearward directions (the axial direction of the partitioning member 56), so that the valve plate 77 can move toward and away from the valve seat 76 for closing and opening the flow path defined by the valve seat 76. The spring 78 normally biases the valve plate 77 in a closing direction toward the valve seat 76 (leftward as viewed in FIG. 9). In this example, a portion of the partitioning member 56 positioned rearwardly (rightwardly as viewed in FIG. 9) of the valve seat 76 has no gas passage hole 56a.

According to this example, the relief valve 75 is normally held in a closed state (see FIG. 9). Therefore, the fuel vapor containing gas flowing into the connection port 54 is discharged into the atmosphere through the adsorption material passage 60 via the atmospheric port 52 with and/or without passing through the air flow passage 58 and the air passage holes 56*a* of the partitioning member 56. Therefore, all of the fuel vapor containing gas flowing into the connection port 54 can pass through the adsorption material passage 60, so that the adsorbing material 61 can efficiently adsorb the fuel vapor.

Figure 10:
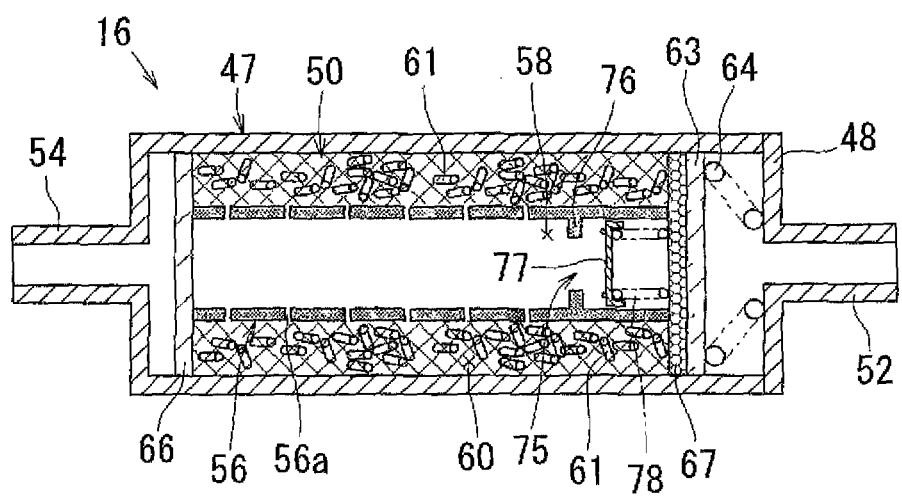
FIG. 10 is a view similar to FIG. 9 but showing a state where a valve is opened.

During filling of fuel or any other possible occasion causing the air pressure within the air flow passage 58 to exceed the predetermined value, the valve plate 77 of the relief valve 75 moves against the biasing force of the spring 78 (see FIG. 10). Therefore, the air can easily flow through the air flow passage 58, so that the fuel filling operation can be facilitated.

During the purging operation, the relief valve 75 is closed (see FIG. 9). Therefore, the air flowing into the atmospheric port 52 flows out of the connection port 54 through the adsorption material passage 60 with and/or without passing through the air passage holes 56*a* of the partitioning member 56 and the air flow passage 58. Therefore, all of the air flowing into the atmospheric port 52 can flow through the adsorption material chamber 60. Hence, it is possible to effectively desorb the fuel adsorbed by the adsorbing material 61.

The relief valve 75 may be replaced with any other valve device that can open and close in response to the pressure of the air flowing through the air flow passage 58 during the fuel filling operation. For example, the relief valve 75 may be replaced with a check valve or a solenoid valve that is opened and closed under the control of the electronic control unit (ECU) during the fuel filling operation.

Fifth Example

Figure 11:
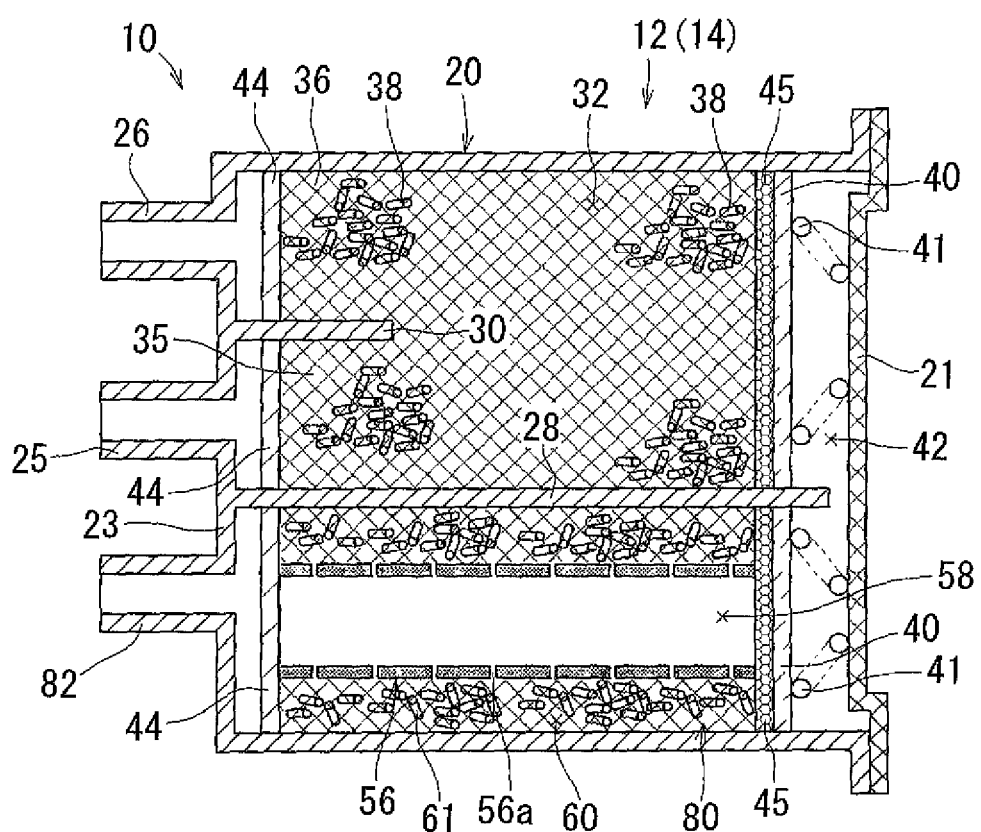
FIG. 11 is a horizontal sectional view of a canister according to a fifth example.

A fifth example will now be described with reference to FIG. 11. In this example, the second case body 16 and the communication pipe 18 as provided in the first example are omitted, so that the case 12 includes only the first case body 14. In this connection, the second adsorption chamber 33 as provided in the first example is replaced with an atmospheric communication chamber 80 that communicates with the first adsorption material chamber 32 via the communication passage 42. In addition, the connection port 24 is replaced with an atmospheric port 82. Further, the partitioning member 56 is disposed coaxially within the atmospheric passage 80 and positioned between the filters 44 and 45. The space within the partitioning member 56 serves as the air flow passage 58, and the space on the outer side of the partitioning member 56 serves as the adsorption material passage 60 in which the adsorption material 61 is disposed.

According to the canister 10 of this example, the adsorption material chamber 32 and the atmospheric communication chamber 80 are integrated within the first case body 14. Therefore, the canister 10 can have a compact construction.

Sixth Example

Figure 12:
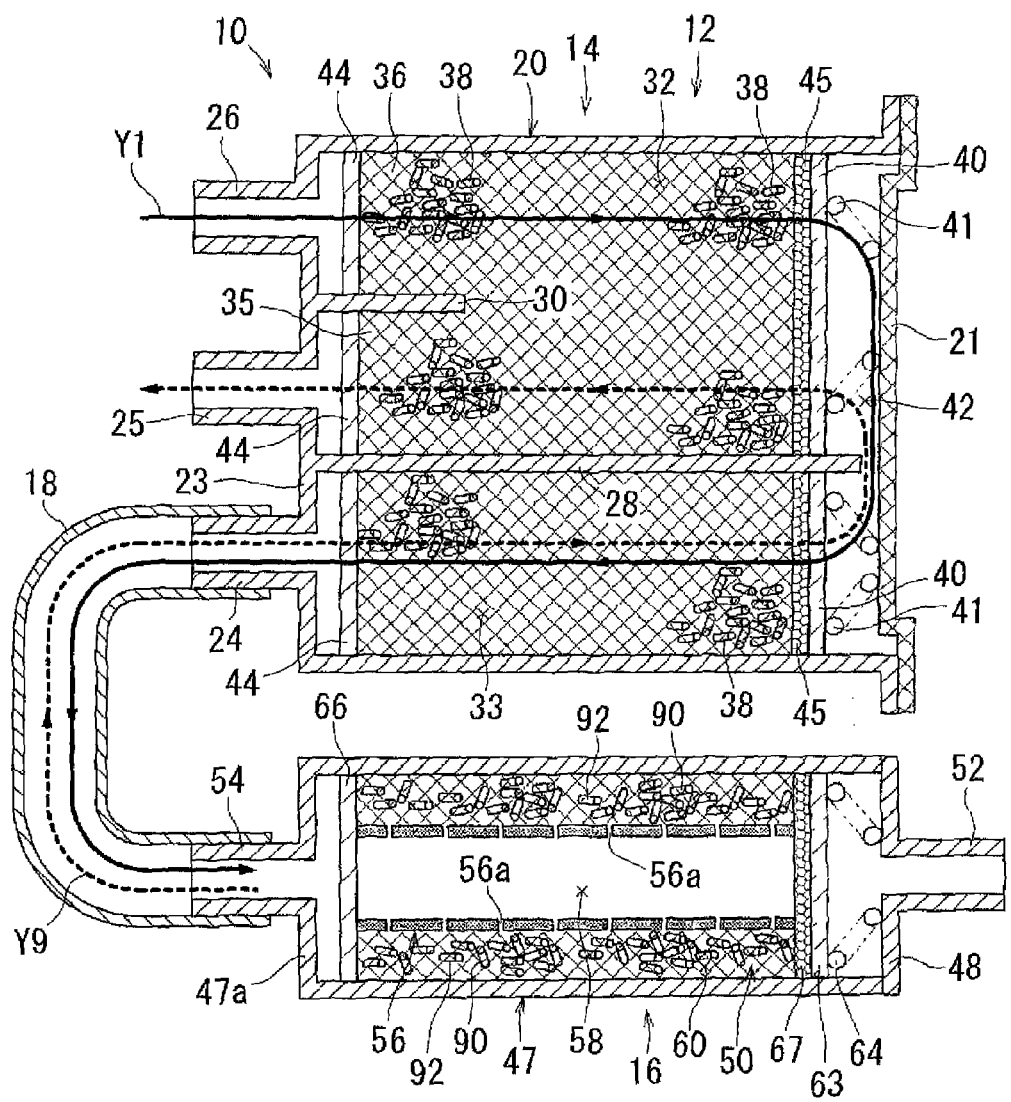
FIG. 12 is a horizontal sectional view of a canister according to a sixth example.

A sixth example will now be described with reference to FIG. 12. Referring to FIG. 12, the adsorption material (activated carbon) 61 disposed within the adsorption material passage 60 of the first example is replaced with a mixture of an adsorption material 90 and a heat storage material 92. Similar to the adsorption material 61, the adsorption material 90 can adsorb the fuel vapor and may be activated carbon granules capable of adsorbing a fuel component, such as butane, contained in the fuel vapor. The heat storage material 92 can absorb or dissipate latent heat in response to change of temperature.

In particular, in this example, activated carbon used for the adsorption material 90 is chosen to have an adsorption ability equal to or more than 13 g/dL in a butane working capacity measured according to ASTM D5228 standard test method. The adsorption ability of the activated carbon used for the adsorption material 90 is preferably equal to or more than 15 g/dL, more preferably, equal to or more than 17 g/dL in the butane working capacity. For the purpose of explanation, the adsorption ability equal to or more than 13 g/dL in the butane working capacity will be referred to as a "high adsorption ability", and the adsorption ability less than 13 g/dL in the butane working capacity will be referred to as a "low adsorption ability." According to this definition, the adsorption material 38 has a low adsorption ability, whereas the adsorption material 90 has a high adsorption ability. The activated carbon for the adsorption material 38 having the lower adsorption ability and the activated carbon for the adsorption material 90 are chosen to have the same specific heat. In general, as the butane working capacity increase, an intermolecular force of the residual content of the fuel vapor becomes larger, so that an amount of the fuel vapor that may be diffused is reduced. As a result, it is possible to reduce an amount of the fuel flowing out through the activated carbon. Therefore, the use of the adsorption material 90 having the high adsorption ability can reduce the amount of fuel vapor flowing out of the adsorption material 90.

Any kind of heat storage material can be used as the heat storage material 92 as long as it is or it contains a phase-change material that can absorb or dissipate latent heat in response to change of temperature. For example, the phase-change material, microcapsules containing the phase-change material or pellets sealingly containing the phase-change material can be used as the heat storage material 92. The heat storage material 92 may have any other configuration and may be arranged in various ways. As the phase-change material, paraffin, such as heptadecane having a melting point of 22° C. and octadecane having a melting point of 28° C., may be used. The latent heat of the heat storage material 92 can be used for inhibiting increase of temperature of the adsorption material (activated carbon) 90 having the high adsorption ability for adsorbing the fuel vapor, so that it is possible to promote adsorption of the fuel vapor by the adsorption material 90. On the other hand, when the fuel vapor is desorbed from the adsorption material (activated carbon) 90 having the high adsorption ability, the latent heat of the heat storage material 92 can be used for inhibiting decrease of temperature of the adsorption material (activated carbon) 90, so that it is possible to promote desorption of the fuel vapor. Therefore, the heat storage material 90 serves as an adsorption promoting material and also serve as a desorption promoting material.

The operation of the canister 10 of the sixth example will be described. During filling of the fuel or during the normal condition (e.g., the parking condition), the fuel vapor contained in the fuel vapor containing gas flowing through the adsorption material passage 60 is adsorbed by the adsorption material 90 (i.e., activated carbon having a high adsorption ability). During this process, latent heat of the heat storage material 92 within the adsorption material chamber 60 inhibits increase of temperature of the adsorption material 90, so that the adsorption of the fuel vapor can be promoted.

During the purging operation (e.g., the purge control operation during driving of the engine), the atmospheric air is brought to pass through the adsorption material passage 60, so that the fuel vapor adsorbed by the adsorption material 90 (i.e., activated carbon having a high adsorption ability) can be desorbed or purged. During this process, latent heat of the heat storage material 92 within the adsorption material chamber 60 inhibits decrease of temperature of the adsorption material 90, so that the desorption of the fuel vapor can be promoted.

According to the canister 10 of this example, activated carbon having a high adsorption ability is used as the adsorption material 90, and therefore, in comparison with generally used activated carbon, it is possible to ensure a high adsorption ability. In addition, because the heat storage material 92 disposed within the adsorption material passage 60 can promote desorption of the fuel vapor. Therefore, even though the adsorption material 90 has a relatively low ability in allowing desorption of the fuel vapor, desorption can be efficiently performed. Hence, it is possible to minimize the residual fuel vapor while reducing the amount of the fuel vapor flowing out of the adsorption material 90. The heat storage material 92 may be replaced with a heating device, such as an electric heater. It is also possible to use the heating device in addition to the heat storage material 92.

The adsorption material 90 used in this example is activated carbon having a high adsorption ability equal to or more than 13 g/dL in the butane working capacity measured according to ASTM D5228 standard test method. Therefore, it is possible to ensure a high adsorption ability.

The adsorption materials 38 used in the adsorption material chambers 32 and 33 in this example are activated carbon having an adsorption ability that is lower in the butane working capacity than that used for the adsorption material 90. Therefore, generally used activated carbon can be used for the adsorption materials 38.

Seventh Example

Figure 13:
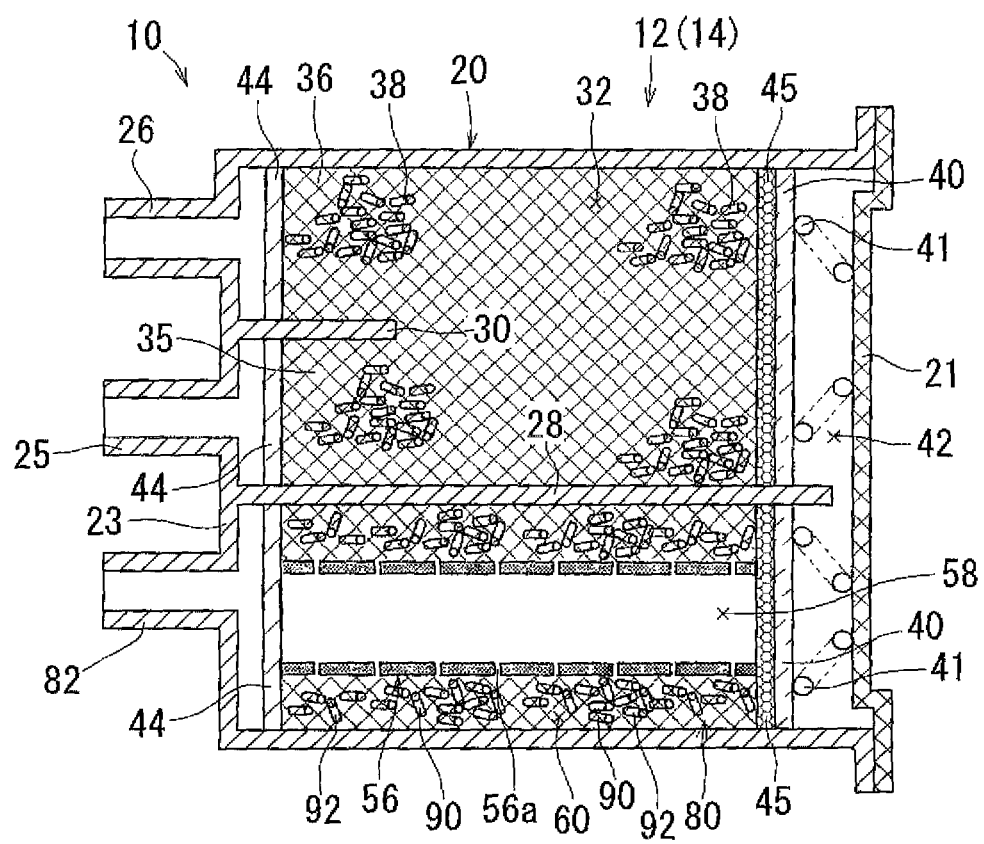
FIG. 13 is a horizontal sectional view of a canister according to a seventh example.
Figure 14:
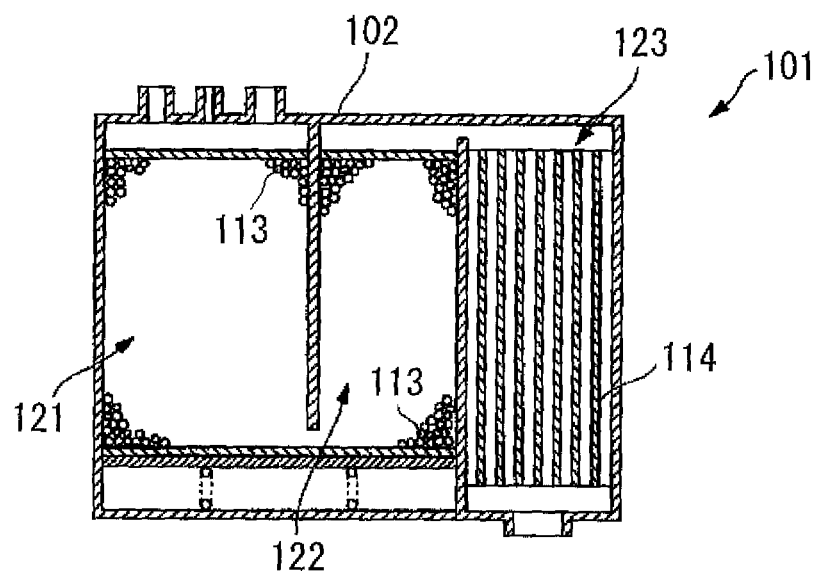
FIG. 14 is a sectional view of a known canister.

A seventh example is a further modification of the fifth example and will now be described with reference to FIG. 13. Referring to FIG. 13, within the adsorption material passage 60 that is similar to that of the fifth example (see FIG. 11), a mixture of the adsorption material 90 and the heat storage material 92 similar to that of the sixth example (see FIG. 12) is filled in place of the adsorption material 61 of the fifth example. As described in connection with the sixth example, activated carbon having a high adsorption ability is used for the adsorption material 90 and the heat storage material 92 can absorb and dissipate latent heat in response to change of temperature.

(Other Possible Modifications)

Activated carbon used for the adsorption material 38 in the sixth and seventh examples can be replaced with that having a high adsorption ability. Additionally, a heat storage material similar to the heat storage material 92 of the sixth example may be mixed with the adsorption material 38 (having a low adsorption ability or a high adsorption ability). Further, the heat storage material 92 may be replaced with a heating device, such as an electric heater. Alternatively, the heating device may be used in combination with the heat storage material 92.

Furthermore, activated carbon of the adsorption materials 38 and 61 of the first to fifth examples may be replaced with any other material than activated carbon as long as it can adsorb the fuel vapor and allow desorption of the fuel vapor.

What is claimed is:

1. A canister comprising:
a case having a tank port communicating with an upper gaseous-phase space within a fuel tank, a purge port communicating with an intake air passage of an engine, and an atmospheric port communicating with an atmosphere, wherein:
the case further includes: an adsorption material chamber communicating between the tank port and the purge port and storing a first adsorption material therein, the first adsorption material being capable of adsorbing fuel vapor and allowing the fuel vapor from being desorbed,
an atmospheric communication chamber communicating between the atmospheric port and the adsorption material chamber, so that air can flow through the atmospheric communication chamber in an air flowing direction; and
a partitioning member disposed within the atmospheric communication chamber and extending along the air flowing direction, so that the atmospheric communication chamber is divided into an air flow passage and an adsorption material passage;
wherein the partitioning member has a tubular shape and includes a plurality of gas passage holes dispersively formed in the partitioning member and extending therethrough in a diametrical direction to allow passage of gas-through the partitioning member in a direction intersecting with the air flowing direction, and
wherein the air flow passage and the adsorption material passage are defined on a radially inner side and a radially outer side of the partitioning member, respectively;
wherein the air flow passage allows passage of air therethrough;
wherein the adsorption material passage has a second adsorption material stored therein; and
wherein the second adsorption material can adsorb fuel vapor and allow desorption of the fuel vapor; wherein the air flow passage and the adsorption material passage are arranged parallel to each other with respect to the air flowing direction.

2. The canister as in claim 1, wherein the partitioning member comprises a plurality of partitioning members.

3. The canister as in claim 1, wherein the case includes:
a first case body having the adsorption material chamber;
a second case having the atmospheric communication chamber; and
a communication member communicating between the adsorption material chamber and the atmospheric communication chamber.

4. The canister as in claim 1, wherein the case is a single component having the adsorption material chamber and the atmospheric communication chamber formed therein.

5. The canister as in claim 1, wherein the second adsorption material contained in the adsorption material passage is activated carbon having a high adsorption ability.

6. The canister as in claim 5, further comprising a desorption promoting device disposed within the adsorption material passage, wherein the desorption promoting device promotes desorption of the fuel vapor from the activated carbon.

7. A canister comprising:
a first fuel vapor adsorption device capable of adsorbing fuel vapor contained in a gas; and
a second fuel vapor adsorption device communicating with the first fuel adsorption device and capable of adsorbing a part of the fuel vapor that still remains in the gas after desorption by the first fuel vapor adsorption device,
wherein the second fuel vapor adsorption device includes:
a first passage containing a fuel vapor adsorption material; a second passage containing no fuel vapor adsorption material;

wherein the first passage and the second passage allowing the gas to flow therethrough independently of each other; and a fuel vapor introduction device allowing the fuel vapor to flow from the second passage into the first passage;

wherein the fuel vapor introduction device comprises a partitioning member having a tubular shape and including a plurality of gas passage holes dispersively formed in the partitioning member and extending therethrough in a diametrical direction to allow passage of gas through the partitioning member in a direction intersecting with the air flowing direction, wherein the first passage and the second passage are defined on a radially inner side and a radially outer side of the partitioning member, respectively, and are arranged parallel to each other with respect to a direction of flow of the gas; and wherein the partitioning member is configured to allow at least a part of fuel vapor contained in the gas to flow from the second passage into the first passage during the flow of the gas through the second passage.

8. The canister as in claim 7, wherein:
the second fuel vapor adsorption device further includes an inlet port communicating with the first fuel vapor adsorption device and an outlet port communicating with an atmosphere; and
each of the first passage and the second passage communicate between the inlet port and the outlet port.

9. The canister as in claim 7, wherein the partitioning member comprises a plurality of partitioning members.

10. The canister as in claim 7, wherein the first and second fuel vapor adsorption devices are separated from each other, and the canister further includes a communication device connected between the first and second fuel vapor adsorption devices for communication therebetween.

11. The canister as in claim 7, further comprising a case in which the first and second fuel vapor adsorption devices are disposed in communication with each other.

12. The canister as in claim 7, wherein the first fuel vapor adsorption device has activated carbon as an adsorption material contained therein, and the adsorption material contained in the first passage of the second fuel vapor adsorption device is activated carbon having an adsorption ability higher than that of the activated carbon contained in the first fuel vapor adsorption device.

13. The canister as in claim 12, further comprising a heating device disposed within the first passage.

14. The canister as in claim 13, wherein the heating device comprises a heat storage material mixed with the activated carbon.

15. The canister as in claim 13, wherein the heating device comprises an electric heater.

16. A canister comprising:
a fuel vapor adsorption device capable of adsorbing fuel vapor contained in a fuel vapor containing gas,
wherein the second fuel vapor adsorption device includes: a first passage containing a fuel, vapor adsorption material; a second passage containing no fuel vapor adsorption material:
wherein the first passage and the second passage allowing the gas to flow therethrough independently of each other; and a fuel vapor introduction device allowing the fuel vapor to flow from the second passage into the first passage;
wherein the fuel vapor introduction device is configured to allow at least a part of fuel vapor contained in the gas to flow from the second passage into the first passage during the flow of the gas through the second passage;
wherein the fuel vapor introduction device comprises a tubular member including a plurality of gas passage holes dispersively formed in the tubular member and extending therethrough in the diametrical direction to allow passage of gas through the tubular member in a direction intersecting with the air flowing direction, and
wherein the first passage and the second passage are defined on a radially inner side and a radially outer side of the tubular member, respectively.

17. The canister according to claim 1, wherein:
the adsorption material passage is defined between an outer circumferential surface of the partition member and an outer circumferential wall of the atmospheric communication chamber.

* * * * *